United States Patent
Kordybach et al.

(10) Patent No.: US 10,257,647 B2
(45) Date of Patent: Apr. 9, 2019

(54) METHODS AND APPARATUSES RELATING TO DETERMINATION OF LOCATIONS OF PORTABLE DEVICES

(71) Applicant: Nokia Technologies Oy, Espoo (FI)

(72) Inventors: Krzysztof Kordybach, Pulawy (PL);
Karol Drazynski, Wroclaw (PL);
Maciej Januszewski, Pila (PL);
Jedrzej Stanczak, Poznan (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/224,875

(22) Filed: Aug. 1, 2016

(65) Prior Publication Data
US 2018/0035255 A1    Feb. 1, 2018

(51) Int. Cl.
*H04W 24/00*        (2009.01)
*H04W 4/02*         (2018.01)
*H04W 4/04*         (2009.01)

(52) U.S. Cl.
CPC ........... *H04W 4/023* (2013.01); *H04W 4/046* (2013.01)

(58) Field of Classification Search
CPC .................................................... H04W 4/023
See application file for complete search history.

(56) References Cited

U.S. PATENT DOCUMENTS

| | | | |
|---|---|---|---|
| 2010/0198513 A1 | 8/2010 | Zeng et al. | |
| 2010/0214085 A1 | 8/2010 | Avery et al. | |
| 2012/0184301 A1* | 7/2012 | Jovicic | G01S 5/0081 455/456.5 |
| 2012/0258733 A1* | 10/2012 | Fischer | H04W 4/20 455/456.1 |
| 2014/0206379 A1* | 7/2014 | Mayor | H04W 64/003 455/456.1 |
| 2015/0228195 A1 | 8/2015 | Beaurepaire et al. | |
| 2016/0021636 A1* | 1/2016 | Krallman | H04W 64/00 455/456.1 |
| 2016/0332624 A1* | 11/2016 | Tezuka | B60W 30/16 |
| 2017/0067982 A1* | 3/2017 | Pan | G01S 5/0252 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.1.0, Mar. 2016, Cover pp. 1 and 2 together with table of contents pp. 8 and 9 and pp. 171-194 ("section 5.10 Sidelink").

(Continued)

*Primary Examiner* — Justin Y Lee
(74) *Attorney, Agent, or Firm* — Locke Lord LLP

(57) ABSTRACT

This specification describes a method comprising detecting presence of a portable device in a vicinity of a first vehicle based on an identifier of the portable device which is detected at first user equipment, UE, located at the first vehicle, and further comprising causing transmission, from the first UE to a second UE located at a second vehicle in the vicinity of the first vehicle, of the identifier of the portable device and measurement data relating to the portable device and collected at the first vehicle, the measurement data being for use at the second vehicle to determine the location of the portable device relative to the second vehicle.

20 Claims, 4 Drawing Sheets

(56) References Cited

OTHER PUBLICATIONS

International Search Report for International Application No. PCT/FI2017/050546, dated Nov. 2, 2017, 5 pages.
Written Opinion of the International Searching Authority for International Application No. PCT/FI2017/050546, dated Nov. 2, 2017, 9 pages.
3GPP TSG-SA WG1 Meeting #71, Belgrade, Serbia, Aug. 17-21, 2015, downloaded by EPO on Aug. 5, 2015, 4 pages.

\* cited by examiner

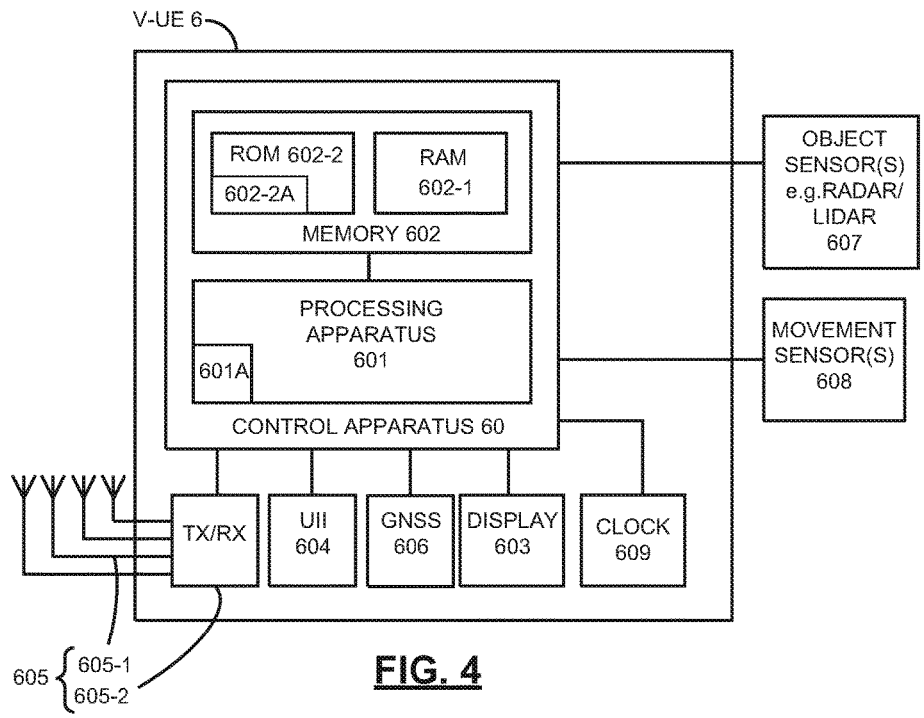
FIG. 4
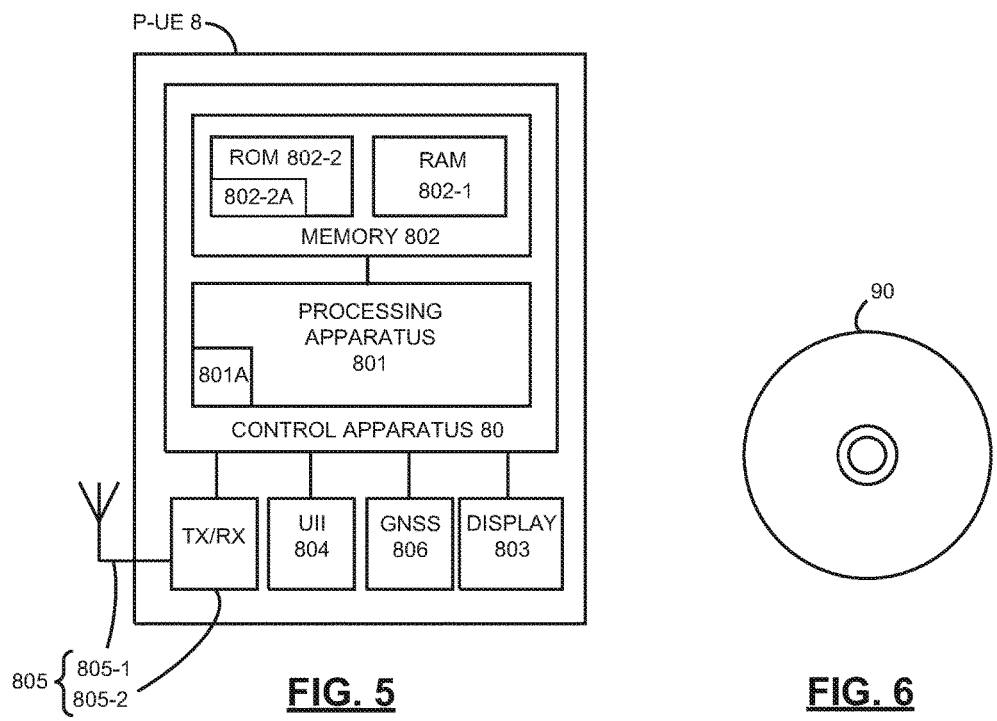
FIG. 5
FIG. 6

METHODS AND APPARATUSES RELATING TO DETERMINATION OF LOCATIONS OF PORTABLE DEVICES

FIELD

This specification relates generally to the determination of locations of portable devices.

BACKGROUND

One of the aims with future E-UTRA (Advanced LTE) and 5G networks is to support Vehicle-to-X (V2X) communication. V2X communication is the passing of information from a vehicle to any entity that may affect the vehicle, and vice versa. This information exchange can be used for a host of safety, mobility and environmental applications to include driver assistance and vehicle safety, speed adaptation and warning, emergency response, safety, traveler information, navigation, traffic operations and demand management, personal navigation, commercial fleet planning and payment transactions. There may be significant societal benefit and commercial value to delivering safety, mobility and convenience applications that rely on V2X.

Basic entities within a V2X communication system are the vehicles (V) and its connectivity to any other Intelligent Transportation System (ITS) station. Therefore, V2X communication systems include transceivers, in the form of eNodeBs (eNBs) or user equipment (UEs) located on vehicles, mounted on the roadside infrastructure, in aftermarket devices, or within handheld devices of pedestrians or other vulnerable road users. V2X communication may include, but not exclusively, Vehicle to Vehicle (V2V) communication, Vehicle to Infrastructure (V2I) communication, and Vehicle to Pedestrian/Portable Device (V2P) communication.

Recent documents published by the 3GPP include provisions for the implementation of V2X. However, much of the implementation detail is still marked as "for future study". The documentation does, however, include a number of aims relating to the safety of road users. These include reducing the number of fatalities caused by vehicles hitting pedestrians to a "zero-level". In order to achieve this goal several smaller requirements have to be satisfied. One such requirement is the precise and accurate positioning of pedestrians (relative to the vehicles), ideally with a granularity down to 20 cm.

SUMMARY

In a first aspect, this specification describes a (computer-implemented) method comprising detecting presence of a portable device in a vicinity of a first vehicle based on an identifier of the portable device which is detected at first user equipment, UE, located at the first vehicle, and further comprising causing transmission, from the first UE to a second UE located at a second vehicle in the vicinity of the first vehicle, of the identifier of the portable device and measurement data relating to the portable device and collected at the first vehicle, the measurement data being for use at the second vehicle to determine the location of the portable device relative to the second vehicle. The method may further comprise enabling receipt, at the first UE from the second UE, of the identifier of the portable device and measurement data relating to the portable device and collected at the second vehicle, and determining, at the first vehicle, the location of the portable device relative to the first vehicle based on the measurement data collected at the first vehicle and the measurement data collected at the second vehicle. The method may also or alternatively comprise enabling receipt, at the first UE from an infrastructural communication node, of the identifier of the portable device and measurement data relating to the portable device and collected at the infrastructural communication node, and determining, at the first vehicle, the location of the portable device relative to the first vehicle based on the measurement data collected at the first vehicle and the measurement data collected at the infrastructural communication node.

In a second aspect, this specification describes a (computer-implemented) method comprising enabling receipt, at a user equipment, UE, located at a vehicle from one or more other UEs each located at a different other vehicle, of an identifier of a portable device detected in a vicinity of each of the other vehicles and measurement data relating to the portable device and collected at the one or more other vehicles, and further comprising determining, at the vehicle, the location of the portable device relative to the vehicle based on the measurement data collected at the one or more other vehicles. The method may further comprise detecting presence of the portable device in a vicinity of the vehicle based on the identifier of the portable device detected at the UE, and determining, at the vehicle, the location of the portable device relative to the vehicle based on the measurement data collected at the one or more other vehicles and measurement data collected at the vehicle. The method may also or alternatively comprise enabling receipt, at the UE located at the vehicle from an infrastructural communication node, of the identifier of the portable device and measurement data relating to the portable device and collected at the infrastructural communication node, and determining, at the vehicle, the location of the portable device relative to the vehicle based on the measurement data collected at the one or more other vehicles and the measurement data collected at the infrastructural communication node.

In a third aspect, this specification describes apparatus comprising at least one processor, and at least one memory including computer program code which, when executed by the at least one processor, causes the apparatus to detect presence of a portable device in a vicinity of a first vehicle based on an identifier of the portable device which is detected at first user equipment, UE, located at the first vehicle, and further causes the apparatus to cause transmission, from the first UE to a second UE located at a second vehicle in the vicinity of the first vehicle, of the identifier of the portable device and measurement data relating to the portable device and collected at the first vehicle, the measurement data being for use at the second vehicle to determine the location of the portable device relative to the second vehicle. The computer program code, when executed by the at least one processor, may cause the apparatus to enable receipt, at the first UE from the second UE, of the identifier of the portable device and measurement data relating to the portable device and collected at the second vehicle, and further to determine, at the first vehicle, the location of the portable device relative to the first vehicle based on the measurement data collected at the first vehicle and the measurement data collected at the second vehicle. The computer program code, when executed by the at least one processor, may also or alternatively cause the apparatus to enable receipt, at the first UE from an infrastructural communication node, of the identifier of the portable device and measurement data relating to the portable device and collected at the infrastructural communication node, and further to determine, at the first vehicle, the location of the portable device relative to the first vehicle based on the measurement data collected at the first vehicle and the measurement data collected at the infrastructural communication node.

In a fourth aspect, this specification describes apparatus comprising at least one processor, and at least one memory including computer program code which, when executed by the at least one processor, causes the apparatus to enable receipt, at a user equipment, UE, located at a vehicle from one or more other UEs each located at a different other vehicle, of an identifier of a portable device detected in a vicinity of each of the other vehicles and measurement data relating to the portable device and collected at the one or more other vehicles, and to determine, at the vehicle, the location of the portable device relative to the vehicle based on the measurement data collected at the one or more other vehicles. The computer program code, when executed by the at least one processor, may cause the apparatus to detect presence of the portable device in a vicinity of the vehicle based on the identifier of the portable device detected at the UE, and to determine, at the vehicle, the location of the portable device relative to the vehicle based on the measurement data collected at the one or more other vehicles and measurement data collected at the vehicle. The computer program code, when executed by the at least one processor, may also or alternatively cause the apparatus to enable receipt, at the UE located at the vehicle from an infrastructural communication node, of the identifier of the portable device and measurement data relating to the portable device and collected at the infrastructural communication node, and to determine, at the vehicle, the location of the portable device relative to the vehicle based on the measurement data collected at the one or more other vehicles and the measurement data collected at the infrastructural communication node.

In the methods of the first and second aspects and the apparatuses of the third and fourth aspects, the measurement data may be transmitted along with error data indicative of a degree of error in the measurement data, and the location of the portable device may be determined based on the measurement data and the error data. Alternatively or additionally, the measurement data may be transmitted along with location data indicative of a location of the vehicle at which the UE which transmits the measurement data is located, and the location of the portable device may be determined based on the measurement data and the location data. Alternatively or additionally, the measurement data may be transmitted along with timing information indicative of a time at which the measurement data was collected. Alternatively or additionally, the measurement data may be transmitted as raw data. Alternatively or additionally, the measurement data may be indicative of, or may enable determination of, a distance between the portable device and the vehicle at which the UE which transmits the measurement data is located. Alternatively or additionally, the transmitted measurement data may be indicative of, or may enable determination of, a direction of the portable device relative to the vehicle at which the UE which transmits the measurement data is located. Alternatively or additionally, the measurement data may be based on a measured two-way propagation delay between the UE at the vehicle and the portable device. Alternatively or additionally, detection of the portable device in the vicinity of the vehicle may be based on receipt, at the UE located at the vehicle and from the portable device, of the identifier of the portable device. Alternatively or additionally, the identifier may uniquely identify the portable device. Alternatively or additionally, the identifier may identify the portable device as being a portable device and/or as being other than a UE associated with a vehicle.

In a fifth aspect, this specification describes apparatus configured to perform any method described with reference to the first and second aspects.

In a sixth aspect, this specification describes computer-readable instructions which, when executed by computing apparatus, causes the computing apparatus to perform any method described with reference to the first and second aspects.

In a seventh aspect, this specification describes a computer-readable medium having computer-readable code stored thereon, the computer-readable code, when executed by at least one processor, causing performance of at least detecting presence of a portable device in a vicinity of a first vehicle based on an identifier of the portable device which is detected at first user equipment, UE, located at the first vehicle, and causing transmission, from the first UE to a second UE located at a second vehicle in the vicinity of the first vehicle, of the identifier of the portable device and measurement data relating to the portable device and collected at the first vehicle, the measurement data being for use at the second vehicle to determine the location of the portable device relative to the second vehicle. The computer-readable code stored on the medium of the seventh aspect may further cause performance of any of the operations described with reference to the method of the first aspect.

In an eighth aspect, this specification describes a computer-readable medium having computer-readable code stored thereon, the computer-readable code, when executed by at least one processor, causing performance of at least enabling receipt, at a user equipment, UE, located at a vehicle from one or more other UEs each located at a different other vehicle, of an identifier of a portable device detected in a vicinity of each of the other vehicles and measurement data relating to the portable device and collected at the one or more other vehicles, and determining, at the vehicle, the location of the portable device relative to the vehicle based on the measurement data collected at the one or more other vehicles. The computer-readable code stored on the medium of the eighth aspect may further cause performance of any of the operations described with reference to the method of the second aspect.

In a ninth aspect, this specification describes apparatus comprising means for detecting presence of a portable device in a vicinity of a first vehicle based on an identifier of the portable device which is detected at first user equipment, UE, located at the first vehicle, and means for causing transmission, from the first UE to a second UE located at a second vehicle in the vicinity of the first vehicle, of the identifier of the portable device and measurement data relating to the portable device and collected at the first vehicle, the measurement data being for use at the second vehicle to determine the location of the portable device relative to the second vehicle.

The apparatus of the ninth aspect may further comprise means for causing performance of any of the operations described with reference to the method of the first aspect.

In a tenth aspect, this specification describes apparatus comprising means for enabling receipt, at a user equipment, UE, located at a vehicle from one or more other UEs each located at a different other vehicle, of an identifier of a portable device detected in a vicinity of each of the other vehicles and measurement data relating to the portable device and collected at the one or more other vehicles, and means for determining, at the vehicle, the location of the portable device relative to the vehicle based on the measurement data collected at the one or more other vehicles. The apparatus of the tenth aspect may further comprise means for causing performance of any of the operations described with reference to the method of the second aspect.

BRIEF DESCRIPTION OF THE FIGURES

For better understanding of the present application, reference will now be made by way of example to the accompanying drawings in which:

FIG. 4 is a schematic illustration of an example configuration of a V-UE which may be configured to perform various operations described with reference to FIGS. 1 to 3;

FIG. 5 is a schematic illustration of an example configuration of a P-UE which may be configured to perform various operations described with reference to FIGS. 1 to 3;

FIG. 6 is an illustration of a computer-readable medium upon which computer readable code may be stored.

DETAILED DESCRIPTION

Figure 1:
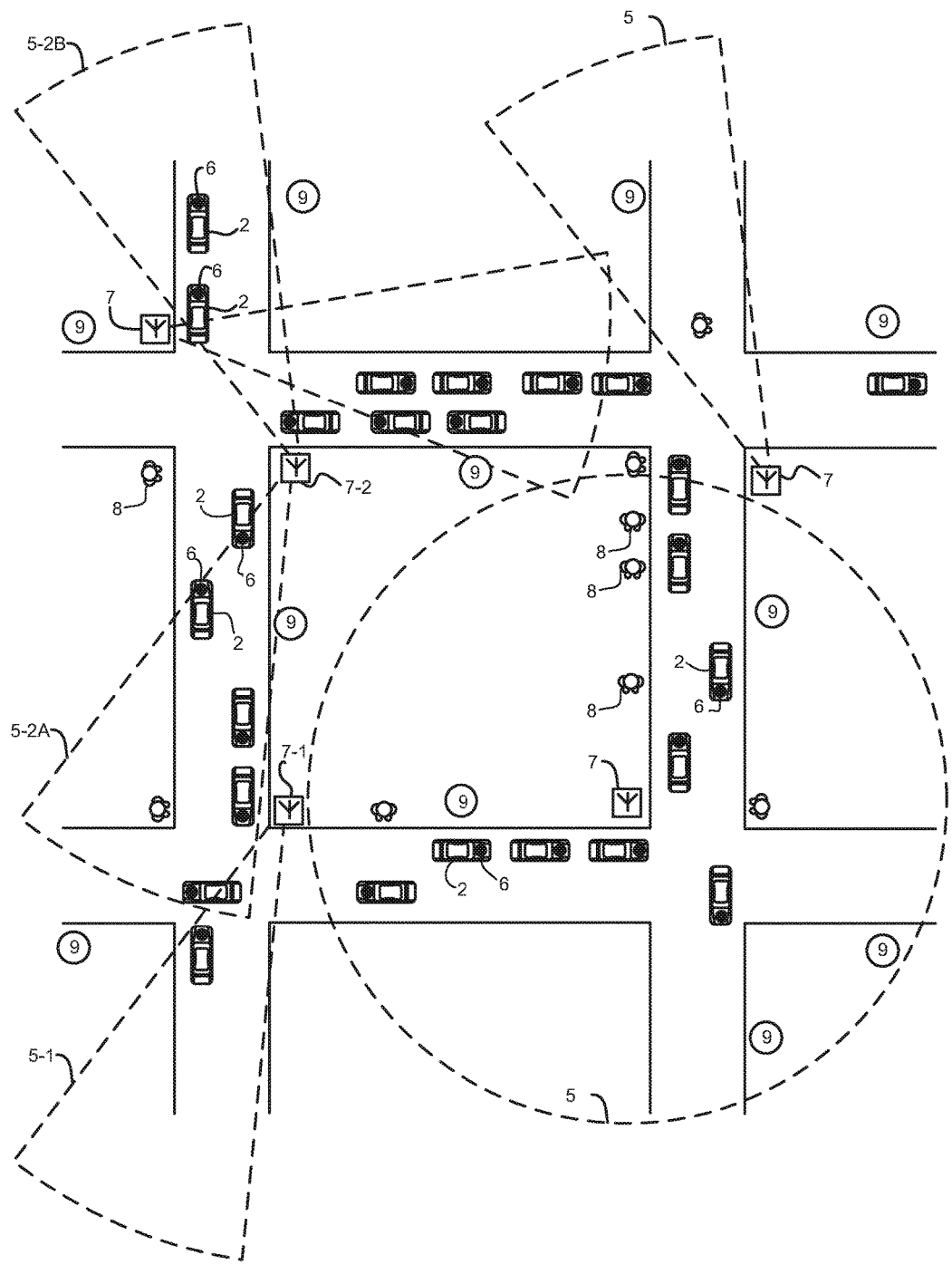
FIG. 1 is an example of a mobile telecommunications radio access network including one or more eNodeBs (eNBs), one or more vehicle user equipments (V-UEs) and one or portable UEs (P-UEs)

In the description and drawings, like reference numerals refer to like elements throughout.

Various methods and apparatuses are described in detail below, by way of example only, in the context of a mobile telecommunications radio access network 1, such as that illustrated in FIG. 1. The network 1 comprises one or more base stations or access points (eNodeBs, eNBs) 7. Only a small number of eNBs 7 are shown in FIG. 1, but a radio access network may typically comprise thousands of eNBs 7. Together, the eNBs 7 may provide radio coverage to one or more user equipment (UE) 6, 8 over a wide geographical area. As illustrated in the example of FIG. 1, the network 1 may also include a plurality of other network nodes 9. The other network nodes 9 may be in the form of roadside units (RSUs) which may be positioned on the various infrastructural units (e.g. road signs, traffic lights, street lamps) which may be provided at relatively short intervals (e.g. 30 meters) along routes of transportation systems.

The mobile telecommunications radio access network 1 may be, but is not limited to, a 5G network or an Evolved Universal Terrestrial Radio Access (E-UTRA) network, which may sometimes be referred to as LTE Advanced network. The eNBs 7, UEs 6, 8 and the other network nodes 9 within the network 1 may be configured to communicate with one another using an OFDM-based access scheme, such as orthogonal frequency division multiple access (OFDMA) and/or single carrier frequency division multiple access (SC-FDMA). For instance, in some non-limiting examples, OFDMA may be used for downlink communications whereas SC-FDMA may be used for uplink communications.

In the example of FIG. 1, the eNBs 7 are shown as providing coverage to a portion of a transportation system, in this case in the form of a series of roads. In such examples, some of the UEs 6 may form part of, or be travelling in, vehicles 2, such as cars. As such, the network 1 and entities therein may be said to be configured for V2X communication. UEs which are carried by or integrated in vehicles may be referred to as "vehicle UEs" (V-UEs) 6.

Also illustrated in FIG. 1 are UEs 8 which are carried by vulnerable road users. These vulnerable road users are shown in FIG. 1 (and FIG. 2) as pedestrians. However, it will of course be understood that they may additionally include cyclists, motorcyclists, Segway users etc. Devices carried by such users will hereafter be referred to as portable UEs (P-UEs) 8. Such P-UEs 8 may be, for instance, portable multi-functional communications devices, such as smartphones etc., or may be more simple wireless communications devices such as location tags or transponders.

In FIG. 1, only a portion of the vehicles 2 and vehicle UEs 6 are indicated using reference numerals. However, it will of course be appreciated that any number of the vehicles travelling in a transportation system may include a vehicle UE 6. Similarly, only some of the vulnerable road users are indicated as having P-UEs 8. However, it will be appreciated than any number of the vulnerable road users may be carrying a P-UE 8. As will also be appreciated, FIG. 1 (and also FIG. 2) is intended for illustrative purposes only and is not to scale.

The P-UEs 8 are configured at least to transmit data packets to V-UEs in the vicinity of the P-UEs 8. Such packets may include an identifier which uniquely identifies the P-UE 8. In this way, the V-UEs 6 may be able to detect the presence of a particular P-UE 8 in their vicinity. In addition, the packets may include information for identifying the P-UE 8 as a portable UE. In this way, the V-UEs 6 may be able to distinguish between P-UEs and other V-UEs 6.

At least some of the P-UEs 8 may be configured to determine their location, for instance using a GNSS module. Additionally or alternatively, the P-UEs 8 may be configured to determine their location based on exchange of cellular data packets exchanged with infrastructural units such as (but not limited to) the eNBs 7 or the RSUs 9. Regardless of the manner in which the P-UEs 8 determine their location, they may be configured to transmit data indicative of this location to the V-UEs 6, in some examples along with their identifier.

At least some of the P-UEs 8 may be configured to transmit data packets to the V-UEs 6 for enabling the V-UEs 6 to determine at least a distance between the V-UE 6 and the P-UE 8. In some instances, the data packets, and the V-UE 6, may also be configured such that the V-UE 6 is able to determine a direction of arrival of the packets (for instance, using a phased array of antennas). Thus, the V-UE 6 may be able to determine the direction towards the P-UEs 8.

The distance between the V-UE 6 and the P-UE 8 may be based on a determined propagation delay of a data packet transmitted from the P-UE 8 to the V-UE 6. Where the P-UE 8 and V-UE 6 are time-synchronised, for instance because they both have access to GNSS, the propagation delay may be a one-way propagation delay. However, in the event that the P-UE 8 and the V-UE 6 are not time-synchronised, for instance because GNSS is not available for one or both UEs 6, 8, the distance may be based on a two-way propagation delay. Specifically, the V-UE 6 may be configured to transmit an initial data packet to the P-UE 8, which is configured to process the data packet and transmit a response packet back to the V-UE 6 after a predetermined duration. Upon receipt of the response packet, the V-UE 6 may be configured to subtract the predetermined duration from the difference between the transmission time of the initial data packet and time of receipt of the response packet, thereby to determine the two-way propagation delay. In some examples, the V-UE 6 may add a time stamp to the initial packet which is indicative of the transmission time of the packet. The P-UE 8 may then simply return the data included in the initial packet (including the timestamp) to the V-UE 6 as the response packet. In this way, the V-UE 6 may not be required to keep a record of the transmission time of the initial packet.

In some examples, the distance may be determined based on the signal strength of the received data packets (as this is indicative of signal attenuation which is indicative of length of the transmission path). In such examples, the V-UE 6 may be aware of the original power with which the data packets are transmitted. For instance, this may be standard across all P-UEs 8 or may be indicated by the P-UE 8 in some way, for instance in a transmitted packet.

In some examples, the V-UEs 6 or the vehicle 2 with which they are associated may include one or more sensors (for instance, RADAR, LIDAR and/or one or more cameras) for enabling the vehicle or V-UE 6 to determine a distance and a direction to a vulnerable road user (and by extension, their P-UE 8). Matching of the sensor data to a particular P-UE 8 may be based on active RFID technology. For instance, the P-UE 8 may be equipped with an active RFID tag (which may have a range of up to 100 m) and so the P-UE may augment the RADAR/LIDAR reflection with its ID. The vehicle/V-UE 6 may thus detect the P-UE ID in the RADAR/LIDAR signal which is reflected back from the P-UE 8. In other examples, the V-UEs 6 may be configured to determine a distance (and maybe also a direction) to the P-UE 8 based on the data packets received from the P-UE 8. This may be performed in addition to determination of the distance/direction based on the sensor data. By comparing the distance (and direction, if applicable) determined based on the received data packets with similar measurements based on the sensor data, the V-UE 6 may be able match the sensor data with a P-UE from which data packets (including the P-UE ID) have been received.

In examples in which V-UEs 6 (or the vehicles at which they are located) are able to determine both the direction and distance from the V-UE 6 (or the vehicle 2) to the P-UE 8 (regardless of the way in which this is determined), the V-UEs 6 may in some instances be configured to use this information to estimate a location of the P-UE 8. This estimation may be performed based on the distance, direction and a location of the V-UE 6.

The location information transmitted by the P-UE 8, the direction and/or distance determined based on one more sensors at the vehicle with which a V-UE 6 is co-located, the distance and/or direction information determined based on receipt of data packets from the P-UEs, and the P-UE location estimated by the V-UEs 6 may collectively be referred to as measurement data relating to the P-UE. Moreover, as will be appreciated the measurement data is indicative of (or, in the case of raw measurement data, enables determination of) at least a distance between the P-UE 8 and the vehicle 2 and/or the associated V-UE 6.

The measurement data may have associated error data indicating a degree of error or unreliability that is associated with the measurement data. This may be determined by the V-UE 6 or some other processing apparatus at the vehicle 2, or may be determined by the P-UE 8 and transmitted to the V-UE 6.

The V-UEs 6 are also configured to communicate bi-directionally with one another, either directly, or via an infrastructural entity such as an eNB 7 or an RSU 9. As such, the V-UEs 6 may exchange data with one another. Data packets transmitted by V-UEs 6 may include indicators indicating that the sender is a V-UE 6.

As mentioned above, in some examples, the V-UEs 6 are configured to determine their location. This may be performed using a global navigation satellite system (GNSS) such as GPS or GLONASS). Alternatively or additionally, this may be performed using a last known position and a determination of a direction and distance of movement since the last known position. The direction and distance of movement since the last known position may, for instance, be determined based on a determination of wheel speed(s) and wheel direction(s) of the vehicle 2 since the last known position. Inertial sensors may also or alternatively be used to determine the direction and distance of movement since the last known position. Regardless of how the distance and direction of movement is determined, this functionality may enable the V-UEs 6 to determine their locations while GNSS is unavailable, for instance when the vehicle 2 is underground or indoors. The V-UEs 6, also or additionally, may be able to determine their position using any other suitable methods, for instance by exchange of data packets with indoor RSUs, location beacons, Wi-Fi access points or the like.

As can be seen in FIG. 4, the V-UEs 6 comprise control apparatus 60 which is configured to control operation of other components which form part of the V-UE 6, thereby to enable transmission of data between V-UEs in the vicinity and, at least, receipt of P-UE IDs from P-UEs 8 in the vicinity. The control apparatus 60 may also enable communication with the eNBs 7 and/or other network nodes 9. The control apparatus 60 may additionally be configured to cause performance of any other operations described herein with reference to the V-UEs 6, for instance with reference to FIGS. 1, 2 and 3. Example configurations of the V-UE control apparatus 60 and the V-UE 6 as a whole are discussed in more detail below, in relation to FIG. 4.

Similarly, as illustrated in FIG. 5, the P-UEs 8 may comprise control apparatus 80 for enabling communication with one or more V-UEs 6, including transmission by the P-UE 8 of their identifier. Where applicable, the control apparatus 80 may also be configured to cause transmission to the V-UEs 6 of location data (e.g. determined based on GNSS or in any other suitable way) and/or packets for enabling the recipient V-UE 6 to determine at least a distance to the P-UE 8. The control apparatus 80 may additionally be configured to cause performance of any other operations described herein with reference to the P-UEs 8. Example configurations of the control apparatus 80 and the P-UE 8 as a whole are discussed in more detail below, in relation to FIG. 5.

Figure 2:
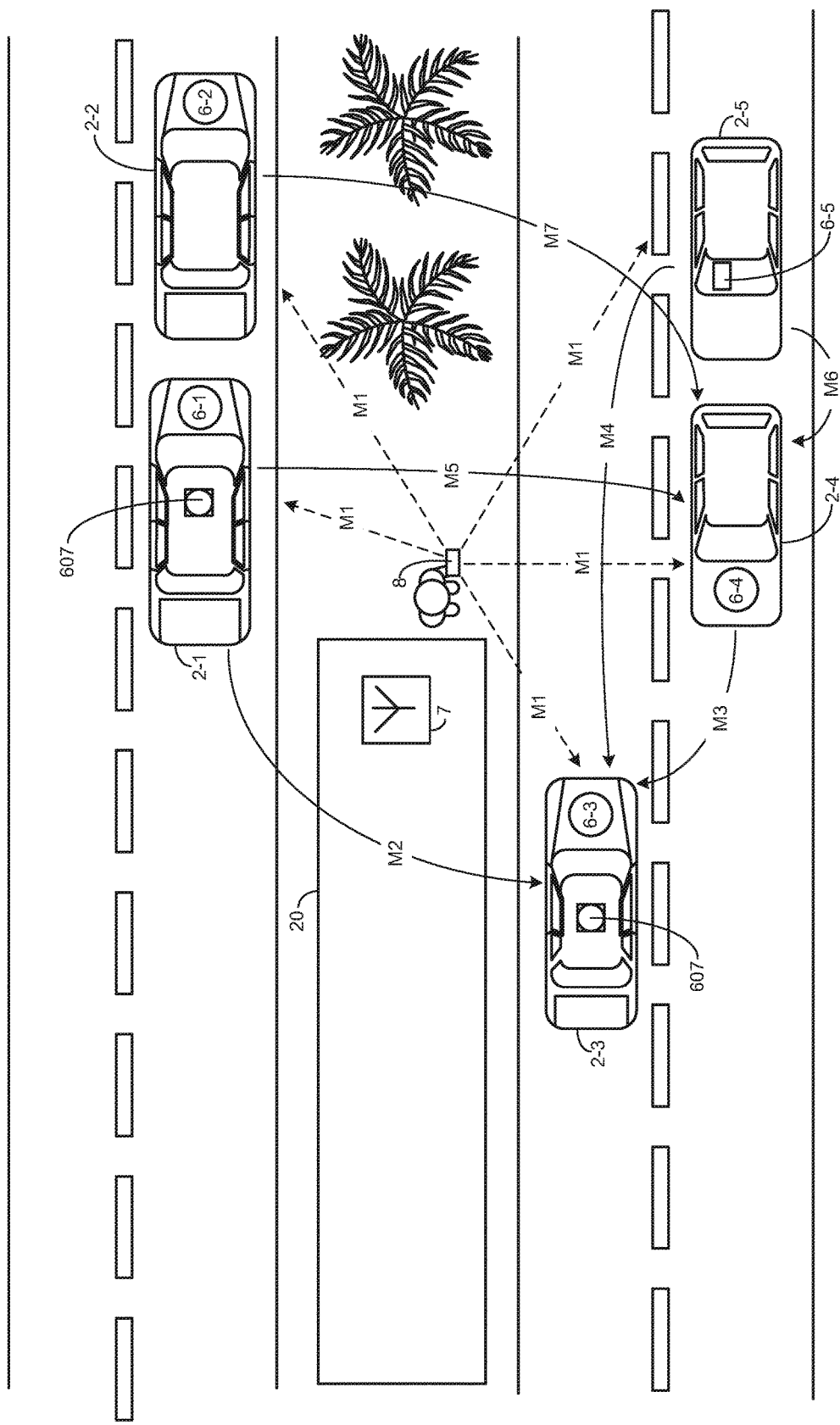
FIG. 2 shows of a part of a network, such as that of FIG. 1, which includes at least plural V-UEs and at least one P-UE, and which illustrates schematically a flow of messages between the UEs.

FIG. 2 is a diagram illustrating an example of a flow of messages between V-UEs 6 and a P-UE 8 for enabling the V-UEs 6 to more accurately determine the location of P-UE 8 in the vicinity. Accurate determination of the location of the P-UE 8 may enable the V-UEs to navigate in a way which improves the safety of the vulnerable road user associated with the P-UE 8.

In the example of FIG. 2, first to fifth V-UEs 6-1 to 6-5, associated with first to fifth vehicles 2-1 to 2-5 are illustrated. In the example, the first to fourth vehicles 2-1 to 2-4 include V-UEs 6-1 to 6-4 which are permanently associated with the vehicle, for example forming part of an on-board computing system. The fifth vehicle 2-5 includes a V-UE 6-5 which is temporarily associated with the vehicle, for instance a portable device located within the vehicle 2-5 and set into "V-UE mode". The first and third vehicles 2-1, 2-3 include sensors 607 (e.g. RADAR, LIDAR cameras etc.) for detecting a location of physical objects in the vicinity of the vehicle. The other vehicles 2-2, 2-4, 2-5 do not include such sensors and so their V-UEs 6-2, 6-4 and 6-5 may determine the distance (and optionally also the direction) to the P-UE 8 based on packets received from the P-UE 8. In the example of FIG. 2, we will assume that the P-UE 8 is not transmitting location data.

As illustrated in FIG. 2, the P-UE 8 broadcasts a first message M1 which is detected by each of the V-UEs 6 in the vicinity. The first message includes the identifying information of the P-UE 8. As such, the V-UEs 6 are able to detect the presence of the P-UE 8 in the vicinity. As will be appreciated, the extent of "the vicinity" as used herein may depend on a communication range of the UEs 6, 8 and/or a sensing range of the one or more sensors 607 associated with the V-UEs 8.

Each of the V-UEs 6 may then, if possible, collect measurement data relating to the P-UE 8 and indicative of at least the distance between the collecting V-UE 6 and the P-UE 8. For instance, the first V-UE 6-1 of the first vehicle 2-1 may collect measurement data from the sensor 607, which may indicate the distance and direction to the P-UE 8. The fourth V-UE 6-4 on the other hand may, for instance, determine a distance (and optionally a direction to the P-UE 8 based on the received message M1 (or one or more data packets subsequently received from the P-UE 8). However, as can be seen in FIG. 2, there is an obstruction 20 which prevents the sensor 607 of the third vehicle 2-3 from using their (line-of-sight) sensors 607 to determine the distance and/or direction to the vulnerable road user associated with the P-UE 8. As such, in this example, it is assumed that the third V-UE 6-3 is unable to collect measurement data indicative of the distance to the P-UE 8.

After collection of the measurement data (where possible), each V-UE 6 may then exchange the collected measurement data with one or more of the other V-UEs 6 in the vicinity. The measurement data may be transmitted along with the identifier of the P-UE 8. For instance, as illustrated in FIG. 2, a second message M2 including the measurement data and the P-UE ID is transmitted from the first V-UE 6-1 to the third V-UE 6-3. Additionally, the first V-UE 6-1 may transmit location information indicating a location of the first vehicle 2-1 (e.g. based on GNSS data). The location information may additionally be transmitted as part of the second message M2. The second message M2 may have been transmitted directly between the first V-UE 6-1 and the third V-UE 6-3, or via an intermediary infrastructural unit such as eNB 7.

Similarly, in the example of FIG. 2, the fourth V-UE 6-4 may also transmit to the third V-UE 6-3 the measurement data collected at the fourth vehicle 2-4, the P-UE ID received in the first message M1 and information indicative of the location of the fourth vehicle 2-4. This may be sent in, for instance, a third message M3. Likewise, the fifth V-UE 6-5 may also transmit, to the third V-UE 6-3, the measurement data collected at the fifth vehicle 2-5, the P-UE ID received in the first message M1 and information indicative of the location of the fifth vehicle 2-5 (in this example in a fourth message M4).

In some examples, the V-UEs 6 may collect measurement data from more than one different source, for instance, the sensor data from the sensors 680 (e.g. RADAR or LIDAR) and data indicative of distance to the P-UE (and, maybe, also a direction to the P-UE) determined based on one or more data packets received from the P-UE 8.

In such examples, the measurement data collected from all sources may be sent to the other V-UEs 6. Alternatively, only measurement data from a particular source may be sent.

The V-UEs 6 may be configured to transmit the measurement data along with timing information (e.g. a timestamp) indicative of a time at which the measurement data was collected. This may enable the recipient V-UE 6 to match measurement data which corresponds to the same time (or period of time). The V-UEs 6 may be synchronised with one another such that they are all configured to collect measurement data at corresponding times.

Because all of the messages received at the third V-UE 6-3 include the same P-UE ID, the third V-UE 6-3 is able to determine that the all of the received measurement data relates to the same P-UE 8. Similarly, the third V-UE 6-4 may be configured to determine, based on timing information transmitted with the measurement data, that the measurement data relates to a common time (or is within an allowable duration). Based on the information included in the received messages (M2 to M4), the third V-UE 6-3 is then able to determine the location of the P-UE 8 (and by extension the location of the person with which it is co-located) even though the third vehicle 6-3 was unable to determine this itself. Thus, the vulnerable road user's location can be taken into account by the third vehicle or its driver, whereas without receipt of the measurement data from other V-UEs 6 this may not have been possible.

The determination of the location of the P-UE 8 may be performed in any suitable way based on the received measurement data. For instance, the V-UEs 6 may be configured to use triangulation based on the three distances from the P-UE 8 to the three V-UEs 6 and the locations of the V-UEs 6, thereby to determine the location of the P-UE 8.

In other examples, for instance when the measurement data transmitted by one of the V-UEs 6 includes information indicative of a direction of the P-UE 8 relative to the V-UE 6, the V-UE 6 which receives the measurement data (in this example, the third V-UE 6-3) may be able to determine the location of the P-UE 8 using measurement data collected at fewer than three different locations.

In yet other examples, for instance when the measurement data transmitted by one of V-UEs 6 includes information indicative of the location of the P-UE 8 (e.g. estimated by the V-UE 6 or received from the P-UE 8), the recipient V-UE 6 may be able to determine the location of the P-UE based on information received from a single V-UE 6. In the event that the measurement data including location data indicative of the location of the P-UE 8 is received from more than one other V-UE 6, this may be, for instance, averaged to arrive at a refined/more accurate location for the P-UE 8.

In view of the above, it will be appreciated that the recipient V-UE 6 (which in the above described example is the third V-UE 6-3) or its control apparatus 60 is configured to enable receipt of one or more data packets at the V-UE 6 from one or more other V-UEs each located at a different other vehicle. The one or more data packets include an identifier of a portable device 8 detected in a vicinity of each of the other vehicles and measurement data indicative of at least one or more distances between the portable device 8 and the one or more other V-UEs 6 and having been collected at the one or more other vehicles. The recipient V-UE 6 is further configured to determine the location of the portable device 8 relative to the recipient V-UE's vehicle based on the measurement data collected at the one or more other vehicles.

As illustrated by messages M5 (from the first V-UE 6-1 to the fourth V-UE 6-4), M6 (from the fifth V-UE 6-5 to the fourth V-UE 6-4) and M7 (from the second V-UE 6-1 to the fourth V-UE 6-4), each of the V-UE 6 may be configured to transmit measurement data collected at their respective vehicle (along with the P-UE identifier) to more than one other V-UE 6. It will therefore be appreciated that each of the transmitting V-UEs (for instance, the fourth V-UE 6-4 in the above described example) or its control apparatus 60 is configured to detect presence of a portable device in a vicinity of the vehicle at which the V-UEs is located based on an identifier of the portable device which is received from the portable device at the V-UE 6. The V-UE 6 is further configured to cause transmission of one or more data packets from the V-UE 6 to one or more other V-UEs located at one or more other vehicles in the vicinity of the transmitting V-UE 6. The one or more data packets include the identifier of the portable device 8 and measurement data collected at the vehicle at which the transmitting V-UE is located. The measurement data is indicative of at least a distance between the portable device 8 and the vehicle at which the transmitting V-UE 6 is location and being for use at the one or more other vehicles to determine the location of the portable device 8 relative to the one or more other vehicles.

Moreover, V-UEs 6 located at vehicles 2 at which measurement data is collected and which also receive measurement data from at least one other V-UE 6 may be configured to utilise both the measurement data collected at their own vehicle as well as the measurement data received from the at least one other V-UE when determining the location of the P-UE 8 relative to their own vehicle. For instance, in FIG. 2, the fourth V-UE 6-4 may be configured to determine the location of the P-UE 8 based on the measurement data collected at its own vehicle (the second vehicle 2-4) in addition to the measurement data received in messages M5, M6 and M7 from the first, fifth and seventh V-UEs 6-1, 6-5 and 6-7.

By using measurement data collected at plural different locations to determine the location of the P-UE 8, the accuracy of the determination may be increased. The accuracy may be increased with increasing number of measurement locations; however a sufficiently high accuracy may be obtained by using measurement data collected from three or four different locations, even if the determining V-UE 6 is unable to collect measurement data at its own location.

As mentioned above, each of the V-UEs 6 may be configured to collect error data indicative of a degree of error in (or reliability of) the measurement data. This error data may then be transmitted along with the measurement data to one or more recipient V-UEs 6 (for instance in messages M1 to M7). The recipient V-UEs 6 may then use the measurement data and the error data to determine the location of the portable device 8, for instance for performing a weighted calculation/determination of the location. Similarly, a V-UE 6 may utilise error data collected at its own vehicle when determining the location of the P-UE 8. As will be appreciated, by utilising error data in addition to the measurement data to determine the location of the P-UE 8, the accuracy with which the location may be determine may be increased. For instance, in one non-limiting example, if the location is determined based on measurement data including location data (e.g. indicative of coordinates of the P-UE 8), the error data may be used to perform a weighted average of the locations indicated by the location data, thereby to improve the accuracy of the determined location.

Also as discussed above, in some examples the measurement data may be transmitted along with location data indicative of a location of the vehicle at which the V-UE transmitting the measurement data is located. This location data may then be used in the determination of the location of the P-UE. Such vehicle location data may, in some examples, actually be necessary for determining the location of the P-UE, for instance when the measurement data indicates only a distance between the vehicle 2/V-UE 6 and the P-UE 8.

The measurement data may be transmitted as raw data. For instance, the measurement data may indicate one or more individual measurements. The one or more individual measurements may include a propagation delay of a received packet, a signal strength of a received packet, a direction of arrival of a received packet, a sensor detected reflection time (e.g. a RADAR reflection time), a sensor-determined direction, a sensor determined distance and GNSS raw data, and any additional information included in the sensor data (e.g. P-UE ID based on active RFID). In some examples, one, some or all of the different types of measurement may have associated error or reliability data. The error or reliability data may be used to assign weights to the different measurements. For example, higher probability of non-line-of-sight conditions may lead to assigning lower weight to the given measurement.

Although not illustrated in FIG. 2, in some examples, measurement data relating to P-UEs 8 may be collected by infrastructural communication nodes, such as eNBs 7 or RSUs 9 (e.g. the eNB 7 pictured in FIG. 2). For instance, the infrastructural communication nodes 7, 9 may receive location information (e.g. determined using GNSS) from the P-UEs 8 within their vicinity. Alternatively or additionally, the infrastructural nodes 7, 9, particularly eNBs 7, may be able to determine the location of P-UEs in other ways. For instance, they may be configured to determine the location of P-UEs 8 based on measurements received from the P-UEs 8 which are indicative of one or more characteristics of reference signals received at the P-UE 8 from one or more eNB 7. The characteristics of the reference signals may include, for instance, reference signal received power (RSRP) and reference signal received quality (RSRQ).

Regardless of the nature of the measurement data collected by an infrastructural communication node 7, 9, the measurement data may be transmitted to one or more V-UEs 6 which is within range of the infrastructural communication node 7, 9. The measurement data may be transmitted along with the P-UE ID to which the measurement data relates and information indicative of a timing associated with the measurement data. In some examples, information allowing identification of the location of the infrastructural communication node may 7, 9 also be transmitted to the V-UEs 6 along with the measurement data. Likewise, in some examples, error data may be transmitted by the infrastructural communication node 7, 9 to the V-UEs along with the measurement data. The V-UEs 6 which receive the measurement data (and any associated information, e.g. timing, P-UE ID, location, error etc.) from an infrastructural communication node 7, 9, may be configured to use the measurement data along with any measurement data collected at the vehicle at which the V-UE 6 is located and/or any received measurement data which was collected at other vehicles. In some examples, the V-UEs 6 may also transmit measurement data collected at the vehicle to the one or more infrastructural communication nodes which may then use this to improve the accuracy with which they are able to track the location of P-UEs 8 within the network.

Figure 3:
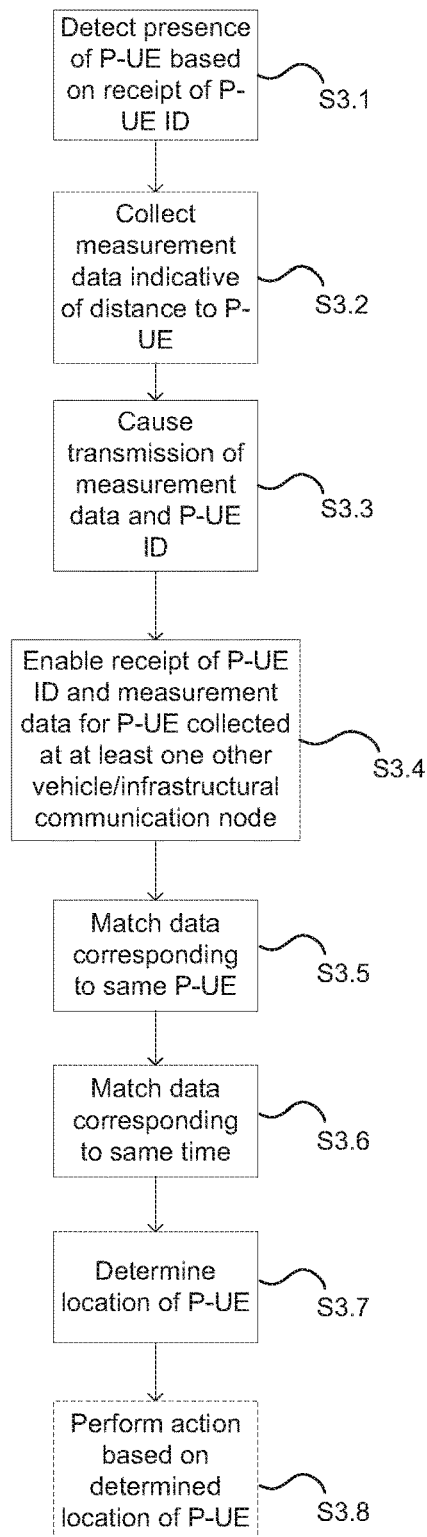
FIG. 3 is a flow chart illustrating various operations which may be performed by one or more V-UEs operating within the network of FIGS. 1 and 2.

FIG. 3 is a flow chart illustrating examples of various operations which may be performed by the V-UEs 6 (or their control apparatuses 60) described above with reference to FIGS. 1 and 2. As will be appreciated, the operations depicted in FIG. 3 correspond to those described above with reference to FIGS. 1 and 2.

In operation S3.1, the V-UE 6 detects the presence of a portable device, P-UE, in the vicinity of the vehicle at which the V-UE 6 is located. This may be determined based on receipt of a data packet from the P-UE 8 by the V-UE 6 which includes information for identifying the P-UE. The information may uniquely identify the P-UE 8. The information may additionally indicate that the UE from which the packet is received is a portable device. The information may also or additionally indicate that the UE is associated with a vulnerable road user (for instance, because the P-UE may be in a particular mode). The information may further indicate the type of vulnerable road user with which the P-UE 8 is associated (e.g. pedestrian, cyclist, motorcyclist etc.).

In operation S3.2, the V-UE 6 collects measurement data indicative of at least the distance between the V-UE 6 and the P-UE 8. As discussed above, the measurement data may also indicate the direction from the V-UE 6 to the P-UE 8. Alternatively or additionally, the measurement data may include location data indicative of the location of the P-UE 8. The data may be measured by the V-UE 6 (for instance, when it is measured based on receipt of data packets from the P-UE), may be received by the V-UE from the P-UE (for instance, when the P-UE transmits location data) and/or may be measured by one or more sensors 680 (e.g. RADAR or LIDAR) located at the vehicle 2.

Although not shown in FIG. 3, as discussed above, the V-UE 6 may be configured also to collect error/reliability data indicative error or reliability in the one more different type of measurement data.

In some examples, the V-UE 6 may be configured to perform the collection of the measurement data (and where appropriate the error data) in response to the detection of the P-UE 8 in the vicinity of the vehicle 2 at which the V-UE 6 is located. Put another way, detection of the P-UE 8 may trigger collection of the measurement data.

In operation S3.3, the V-UE 6 causes transmission of the collected measurement data and information identifying the P-UE 8 to at least one other V-UE 6 in the vicinity. For instance, the V-UE 6 may be configured to multicast or broadcast the measurement data and the information identifying the P-UE 8. The measurement data may be relayed via the network infrastructure (e.g. an RSU 9). Alternatively, the measurement data and the information identifying the P-UE 8 may be transmitted point-to-point to the one or more V-UEs 6 which have previously been detected in the vicinity. As mentioned above, the V-UE 6 may also cause transmission of the error data and/or of location data indicative its own location to the other V-UEs 6 in the vicinity.

In operation S3.4, the V-UE 6 enables receipt, at the V-UE 6 from one or more other V-UEs 6 in the vicinity, of measurement data and information identifying a P-UE 8 to which the data relates. In some examples, measurement data which was collected at an infrastructural communication node 7, 9 may, also or alternatively, be received at the V-UE 6 from the infrastructural communication node 7, 9 along with information identifying the P-UE 8. Error data corresponding to the received measurement data and/or location data indicative of the location of the V-UE 6 (or vehicle)/infrastructural communication node 7, 9 at which the measurement data was collected may also be received.

In operation S3.5, the V-UE 6 may match measurement data which relates to the same P-UE 8 based on the identifying information transmitted with the measurement data. Put another way, the V-UE 6 may be configured to determine which measurement data relates to a common P-UE 8. This may be particularly important when plural P-UEs 8 are in the vicinity of the V-UEs 6.

Similarly, in operation S3.6, the V-UE 6 may match measurement data which relates to the same time (or which are within an allowable offset) based on the timing information received with the measurement data.

In operation S3.7, the V-UE 6 determines the location of the P-UE 8 based on at least the measurement data received from one or more V-UEs 6 and/or infrastructural nodes 7, 9 which relates to the common P-UE 8 and which relates to the same time. If the recipient V-UE 6 was also able to collect measurement data itself, this measurement data may additionally be used by recipient V-UE to determine the location of the P-UE 8. As discussed above, any received error data and/or location data identifying locations of the V-UEs 6/infrastructural nodes 7, 9 from which the measurement data was received may additionally be used for the determination of the location.

In operation S3.8, the location may be used for instance, by an on-board computer (which may form part of the V-UE 6), to control operation of the vehicle 2 based on the determined location of the P-UE 8.

Although not illustrated in FIG. 3, it will be appreciated that many of the operations illustrated in FIG. 3 may be performed at regular intervals thereby to enable the V-UEs 6 to maintain an up-to-date record of the P-UEs 8 in the vicinity and their locations.

As will be appreciated, the flow chart of FIG. 3 is an example only. As such, various operations may be omitted, re-ordered or combined. For instance, in some instances, the V-UE 6 may not be able to collect measurement data (e.g. due to interference, attenuation, reflection etc.) and so operations S3.2 and S3.3 may be omitted. Similarly, operations S3.3 and S3.4 may, for example, be performed in a different order.

At least some of the methods and apparatuses described herein may improve the accuracy with which vehicles are able to determine location of vulnerable road users in the vicinity and/or may enable detection of such road users when they are "hidden" from the vehicle, e.g. by an intermediate object/obstruction. Furthermore, at least some of the methods and apparatuses may be robust in that their ability to detect and locate vulnerable road users may not deteriorate to a significant degree in bad weather conditions (as may be the case with a purely sensor-based detection system). Furthermore, because some of the methods described herein identify individual road users based on the ID of their P-UE, they may allow the V-UEs to track the road user's movement, thereby enabling prediction of what the road user is likely to do next. Finally, it is noted that at least some of the methods and apparatuses described herein may be able to fulfil stringent latency requirements inherently associated with ultra-reliable low latency communications (URLLC).

As will be appreciated, all of the above-described benefits (at least some of which may result from at least some of the methods and apparatuses described herein) may serve to improve the safety of vulnerable road users, in particular by reducing the occurrence of collisions in which a vehicle user (e.g. a car driver) is unable to realize in sufficient time that their vehicle is moving towards a pedestrian (or the like) until it is too late to prevent the collision. As will be appreciated, at least some of the above-described benefits may also apply to autonomous and driver-assisting vehicles, which may be configured to automatically take action to prevent the collision.

FIG. 4 is a schematic illustration of an example configuration of one or more of the V-UEs 6 depicted in FIGS. 1 and 2, which may be configured to communicate with the other V-UEs 6 and P-UEs 8 in the vicinity via a wireless interface. The V-UE 6 may be any device capable of at least sending and receiving radio signals to and from the V-UEs 6 and P-UEs 8 (directly and/or indirectly) and of performing various operations described above with respect to V-UEs 6. As mentioned previously, the V-UEs 6 may be integrated with or otherwise co-located with a vehicle 2.

The V-UE 6 may communicate via an appropriate radio interface arrangement 605. The interface arrangement 605 may be provided for example by means of a radio part 605-2 (e.g. a transceiver) and an associated antenna arrangement 605-1. In some examples, the antenna arrangement 605-1 may comprise an array of plural antennas. These may be arranged for enabling estimation of a direction of arrival of data packets received from other devices (such as P-UE 8).

The radio interface arrangement may be configured for communicating with one or more eNBs 7 and or other network nodes 9 (e.g. Wi-Fi access points) in the vicinity in the V-UE 6.

As discussed above, the V-UE 6 comprises control apparatus 60 which is operable to control the other components of the V-UE 6 in addition to performing any suitable combinations of the operations described in connection with the V-UEs 6 with reference to FIGS. 1 to 3. The V-UE control apparatus 60 may comprise processing apparatus 601 and memory 602. Computer-readable code 602-2A may be stored on the memory, which when executed by the processing apparatus 601, causes the control apparatus 60 to perform any of the operations described herein in relation to the V-UE 6. Example configurations of the memory 602 and processing apparatus 601 will be discussed in more detail below.

The V-UE 6 may further comprise a positioning module 606 for determining its geographic location. This module 606 may determine the location of the V-UE 6 in any suitable way and may be for instance a global Navigation satellite system (GNSS) module.

The V-UE 6 may be, for example, a device that does not need human interaction, such as an entity that is involved in Machine Type Communications (MTC). Alternatively, the V-UE 6 may be a device designed for tasks involving human interaction such as making and receiving phone calls between users, and streaming multimedia or providing other digital content to a user.

The V-UE 6 may be, for instance, a smart phone, an on-board computer of a vehicle, a tablet computer, an e-reader device, a laptop computer, and a notebook computer provided with a wireless interface facility.

In implementations in which the V-UE 6 is a device designed for human interaction, the user may control the operation of the V-UE 6 by means of a suitable user input interface UII 604 such as key pad, voice commands, touch sensitive screen or pad, combinations thereof or the like. A display 603, a speaker and a microphone may also be provided. Furthermore, the V-UE 6 may comprise appropriate connectors (either wired or wireless) to other devices and/or for connecting external accessories, for example hands-free equipment, thereto.

The V-UE 6 may further comprise a clock 609 for use in time synchronisation with the other devices. The clock 609 may be kept accurate by receiving update information from the GNSS module. The clock may have minimal drift and so may maintain reliability even when the GNSS module 606 is unavailable.

In some examples, the V-UE 6 may comprise (or otherwise be communicatively coupled with) one or more object sensing devices 607 for detecting objects in the vicinity of the vehicle 2 at which the V-UE 6 is located. For instance, the one or more object sensing devices 607 may comprise any combination of one or more RADAR devices, one or more LIDAR devices, and one or more cameras. These devices 607 may for instance provide to the V-UE 6 measurement data indicative of a direction and/or distance to objects in the vicinity of the vehicle 2.

In some examples, the V-UE 6 may comprise (or otherwise be communicatively coupled with) one or more motion sensing devices 608 for determining movement of the V-UE 6 or the vehicle 2 with which it is co-located. For instance, the motion sensors 608 may comprise any combination of one or more inertial sensors, a wheel-direction sensor and a wheel-speed sensor. The movement sensor(s) may provide data for enabling the V-UE 6 to determine its location when GNSS is unavailable, for instance when the V-UE is under cover (e.g. in a parking garage).

FIG. 5 is a schematic illustration of an example configuration of one or more of the P-UEs 8 depicted in FIGS. 1 and 2, which may be configured to communicate with the V-UEs 6 in its vicinity via a wireless interface. The P-UE 8 may be any device capable of at least sending radio signals to (and in some examples receiving signals from the V-UEs 6) and of performing the various operations described above with respect to P-UEs 8.

The P-UE 8 may communicate via an appropriate radio interface arrangement 805. The interface arrangement 805 may be provided for example by means of a radio part 805-2 (e.g. a transceiver) and an associated antenna arrangement 805-1. The antenna arrangement 805-1 may be arranged internally or externally to the P-UE 8.

The radio interface arrangement 805 may also be configured for communicating with one or more eNBs 7 and or other network nodes 9 (e.g. Wi-Fi access points) in the vicinity in the P-UE 8.

As discussed above, the P-UE 8 comprises control apparatus 80 which is operable to control the other components of the P-UE 8 in addition to performing any suitable combinations of the operations described in connection with P-UE 8 with reference to FIGS. 1 to 3. The P-UE control apparatus 80 may comprise processing apparatus 801 and memory 802. Computer-readable code 802-2A may be stored on the memory, which, when executed by the processing apparatus 801, causes the control apparatus 80 to perform any of the operations described herein in relation to the P-UE 8. Example configurations of the memory 802 and processing apparatus 801 will be discussed in more detail below.

The P-UE 8 may, in some instances, further comprise a positioning module 806 for determining its geographic location. This module 806 may determine the location of the P-UE 8 in any suitable way and may be for instance a global Navigation satellite system (GNSS) module.

The P-UE 8 may be, for example, a device that does not need human interaction, such as an entity that is involved in Machine Type Communications (MTC). Alternatively, the P-UE 8 may be a device designed for tasks involving human interaction such as making and receiving phone calls between users, and streaming multimedia or providing other digital content to a user.

The P-UE 8 may be any device that is provided with a wireless interface facility and is suitable to be carried by a person. For instance, the P-UE 8 may be any of a smart phone, a location tag, a tablet computer, an e-reader device, a laptop computer, and a notebook computer.

In implementations in which the P-UE 8 is a device designed for human interaction, the user may control the operation of the P-UE 8 by means of a suitable user input interface UII 804 such as key pad, voice commands, touch sensitive screen or pad, combinations thereof or the like. A display 803, a speaker and a microphone may also be provided. Furthermore, the P-UE 8 may comprise appropriate connectors (either wired or wireless) to other devices and/or for connecting external accessories, for example hands-free equipment, thereto.

Although not shown in FIG. 5, the P-UE 8 may further comprise a clock for use in time synchronisation with the other devices. When the P-UE 8 also includes a positioning module, the clock may be kept accurate by receiving update information from the positioning module.

Some further details of components and features of the above-described devices/entities/apparatuses 6, 8 and alternatives for them will now be described.

The control apparatuses described above 60, 80 may comprise processing apparatus 601, 801 communicatively coupled with memory 602, 802. The memory 602, 802 has computer readable instructions 602-2A, 802-2A stored thereon, which when executed by the processing apparatus 601, 801 causes the control apparatus 60, 80 to cause performance of various ones of the operations described with reference to FIGS. 1 to 5. The control apparatus 60, 80 may in some instance be referred to, in general terms, as "apparatus".

The processing apparatus 601, 801 may be of any suitable composition and may include one or more processors 601A, 801A of any suitable type or suitable combination of types. Indeed, the term "processing apparatus" should be understood to encompass computers having differing architectures such as single/multi-processor architectures and sequencers/parallel architectures. For example, the processing apparatus 601, 801 may be a programmable processor that interprets computer program instructions 602-2A, 802-2A and processes data. The processing apparatus 601, 801 may include plural programmable processors. Alternatively, the processing apparatus 601, 801 may be, for example, programmable hardware with embedded firmware. The processing apparatus 601, 801 may alternatively or additionally include one or more specialised circuit such as field programmable gate arrays FPGA, Application Specific Integrated Circuits (ASICs), signal processing devices etc. In some instances, processing apparatus 601, 801 may be referred to as computing apparatus or processing means.

The processing apparatus 601, 801 is coupled to the memory 602, 802 and is operable to read/write data to/from the memory 602, 802. The memory 602, 802 may comprise a single memory unit or a plurality of memory units, upon which the computer readable instructions (or code) 602-2A, 802-2A is stored. For example, the memory 602, 802 may comprise both volatile memory 602-1, 802-1 and non-volatile memory 602-2, 802-2. In such examples, the computer readable instructions/program code 602-2A, 802-2A may be stored in the non-volatile memory 602-2, 802-2 and may be executed by the processing apparatus 601, 801 using the volatile memory 602-1, 802-1 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The memory 602, 802 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

The computer readable instructions/program code 602-2A, 802-2A may be pre-programmed into the control apparatus 60, 80. Alternatively, the computer readable instructions 602-2A, 802-2A may arrive at the control apparatus via an electromagnetic carrier signal or may be copied from a physical entity 90 such as a computer program product, a memory device or a record medium such as a CD-ROM or DVD an example of which is illustrated in FIG. 6. The computer readable instructions 602-2A, 802-2A may provide the logic and routines that enables the entities devices/apparatuses 6, 8 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although the method and apparatus have been described in connection with an E-UTRA network, it will be appreciated that they are not limited to such networks and are applicable to radio networks of various different types.

Although various aspects of the methods, apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. Apparatus comprising:
   at least one processor; and
   at least one memory including computer program code which, when executed by the at least one processor, causes the apparatus:
   to detect presence of a portable device in a vicinity of a first vehicle based on an identifier of the portable device which is detected at first user equipment, UE, located at the first vehicle;
   to cause transmission, from the first UE to a second UE located at a second vehicle in the vicinity of the first vehicle, of the identifier of the portable device and measurement data relating to the portable device and collected at the first vehicle, the measurement data enabling the location of the portable device relative to the second vehicle to be determined at the second vehicle;

to enable receipt, at the first UE from the second UE, of the identifier of the portable device and measurement data relating to the portable device and collected at the second vehicle; and to determine, at the first vehicle, the location of the portable device relative to the first vehicle based on the measurement data collected at the first vehicle and the measurement data collected at the second vehicle.

2. The apparatus of claim 1, wherein the computer program code, when executed by the at least one processor, causes the apparatus:

to enable receipt, at the first UE from an infrastructural communication node, of the identifier of the portable device and measurement data relating to the portable device and collected at the infrastructural communication node; and to determine, at the first vehicle, the location of the portable device relative to the first vehicle based on the measurement data collected at the first vehicle, the measurement data collected at the second vehicle and the measurement data collected at the infrastructural communication node.

3. Apparatus comprising:

at least one processor; and at least one memory including computer program code which, when executed by the at least one processor, causes the apparatus:

to detect presence of a portable device in a vicinity of a vehicle based on an identifier of the portable device which is detected at user equipment, UE, located at the vehicle;

to cause transmission, from the UE to one or more other UEs each located at a different other vehicle in the vicinity of the vehicle, of the identifier of the portable device and measurement data relating to the portable device and collected at the vehicle, the measurement data enabling the location of the portable device relative to the one or more other vehicles to be determined at the one or more other vehicles;

to enable receipt, at the UE located at the vehicle from the one or more other UEs, of the identifier of the portable device detected in a vicinity of each of the one or more other vehicles and measurement data relating to the portable device and collected at the one or more other vehicles; and to determine, at the vehicle, the location of the portable device relative to the vehicle based on the measurement data collected at the vehicle and the measurement data collected at the one or more other vehicles.

4. The apparatus of claim 3, wherein the computer program code, when executed by the at least one processor, causes the apparatus:

to enable receipt, at the UE located at the vehicle from an infrastructural communication node, of the identifier of the portable device and measurement data relating to the portable device and collected at the infrastructural communication node; and to determine, at the vehicle, the location of the portable device relative to the vehicle based on the measurement data collected at the vehicle, the measurement data collected at the one or more other vehicles and the measurement data collected at the infrastructural communication node.

5. The apparatus of claim 3, wherein at least one of the measurement data collected at the vehicle or the measurement data collected at the one or more other vehicles is transmitted and received, respectively, along with error data indicative of a degree of measurement data error, and wherein the location of the portable device is determined further based on the error data.

6. The apparatus of claim 3, wherein at least one of the measurement data collected at the vehicle or the measurement data collected at the one or more other vehicles is transmitted and received, respectively, along with location data indicative of a location of a vehicle at which a UE which collected, either the transmitted or the received measurement data is located, and wherein the location of the portable device is determined further based on the location data.

7. The apparatus of claim 3, wherein at least one of the measurement data collected at the vehicle or the measurement data collected at the one or more other vehicles is transmitted and received, respectively, along with timing information indicative of measurement data time of collection.

8. The apparatus of claim 3, wherein at least one of the measurement data collected at the vehicle or the measurement data collected at the one or more other vehicles is transmitted and received, respectively, as raw data.

9. The apparatus of claim 3, wherein at least one of transmitted measurement data collected at the vehicle or received measurement data collected at the one or more other vehicles is indicative of, or enables determination of, a distance between the portable device and a vehicle at which a UE which collected either the transmitted or the received measurement data is located.

10. The apparatus of claim 3, wherein at least one of transmitted measurement data collected at the vehicle or received measurement data collected at the one or more other vehicles is indicative of, or enables determination of, a direction of the portable device relative to a vehicle at which a UE which collected either the transmitted or the received measurement data is located.

11. The apparatus of claim 3, wherein the measurement data collected at the vehicle is based on a measured two-way propagation delay between the UE at the vehicle and the portable device.

12. The apparatus of claim 3, wherein detecting the presence of the portable device in the vicinity of the vehicle is based on receipt, at the UE located at the vehicle and from the portable device, of the identifier of the portable device.

13. The apparatus of claim 3, wherein the identifier uniquely identifies the portable device.

14. The apparatus of claim 3, wherein the identifier identifies the portable device as being a portable device and/or as being other than a UE associated with a vehicle.

15. A method comprising:

detecting presence of a portable device in a vicinity of a first vehicle based on an identifier of the portable device which is detected at first user equipment, UE, located at the first vehicle;

causing transmission, from the first UE to a second UE located at a second vehicle in the vicinity of the first vehicle, of the identifier of the portable device and measurement data relating to the portable device and collected at the first vehicle, the measurement data enabling the location of the portable device relative to the second vehicle to be determined at the second vehicle;

enabling receipt, at the first UE from the second UE, of the identifier of the portable device and measurement data relating to the portable device and collected at the second vehicle; and determining, at the first vehicle, the location of the portable device relative to the first vehicle based on the measurement data collected at the first vehicle and the measurement data collected at the second vehicle.

16. The method of claim 15, further comprising:

enabling receipt, at the first UE from an infrastructural communication node, of the identifier of the portable device and measurement data relating to the portable device and collected at the infrastructural communication node; and determining, at the first vehicle, the location of the portable device relative to the first vehicle based on the measurement data collected at the first vehicle, the measurement data collected at the second vehicle and the measurement data collected at the infrastructural communication node.

17. A method comprising:

detecting presence of a portable device in a vicinity of a vehicle based on an identifier of the portable device which is detected at user equipment, UE, located at the vehicle;

causing transmission, from the UE to one or more other UEs each located at a different other vehicle in the vicinity of the vehicle, of the identifier of the portable device and measurement data relating to the portable device and collected at the vehicle, the measurement data enabling the location of the portable device relative to the one or more other vehicles to be determined at the one or more vehicles;

enabling receipt, at the UE located at the vehicle from the one or more other UEs, of the identifier of the portable device detected in a vicinity of each of the one or more other vehicles and measurement data relating to the portable device and collected at the one or more other vehicles; and determining, at the vehicle, the location of the portable device relative to the vehicle based on the measurement data collecting at the vehicle and the measurement data collected at the one or more other vehicles.

18. The method of claim 17, comprising:

enabling receipt, at the UE located at the vehicle from an infrastructural communication node, of the identifier of the portable device and measurement data relating to the portable device and collected at the infrastructural communication node; and determining, at the vehicle, the location of the portable device relative to the vehicle based on the measurement data collected at the vehicle, the measurement data collected at the one or more other vehicles and the measurement data collected at the infrastructural communication node.

19. Apparatus comprising:

at least one processor; and at least one memory including computer program code which, when executed by the at least one processor, causes the apparatus:

to enable receipt, at a user equipment, UE, located at a vehicle from one or more other UEs each located at a different other vehicle, of an identifier of a portable device detected in a vicinity of each of the other vehicles and measurement data relating to the portable device and collected at the one or more other vehicles, wherein the measurement data is received along with error data indicative of a degree of error in the measurement data; and to determine, at the vehicle, the location of the portable device relative to the vehicle based on the measurement data collected at the one or more other vehicles and the error data by assigning weights to the measurement data based on the error data, and performing a weighted average of locations indicated by the measurement data.

20. The apparatus of claim 19, wherein the computer program code, when executed by the at least one processor, causes the apparatus to assign a lower weight to measurement data associated with a higher probability of non-line-of-sight conditions.

* * * * *